(12) United States Patent
Koerner

(10) Patent No.: US 6,351,704 B1
(45) Date of Patent: Feb. 26, 2002

(54) METHOD AND APPARATUS FOR CALIBRATING A POSITION SENSOR USED IN ENGINE CONTROL

(75) Inventor: Scott A. Koerner, Kenosha, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/540,691

(22) Filed: Mar. 31, 2000

(51) Int. Cl.$^7$ .......................... F02D 11/10; F02D 41/04
(52) U.S. Cl. ........................ 701/115; 123/399
(58) Field of Search ............... 123/396, 399, 123/400, 361; 701/102, 103, 114, 115; 73/1.75, 1.88

(56) References Cited

U.S. PATENT DOCUMENTS

| | | | | |
|---|---|---|---|---|
| 4,622,936 A | * | 11/1986 | Junginger et al. | 123/399 |
| 4,705,001 A | * | 11/1987 | Danno et al. | 123/361 |
| 5,033,431 A | * | 7/1991 | Poirier et al. | 123/399 |
| 5,445,126 A | * | 8/1995 | Graves, Jr. | 123/399 |
| 5,742,921 A | * | 4/1998 | Oo et al. | 701/102 |
| 6,026,783 A | * | 2/2000 | Nestvall et al. | 123/399 |

* cited by examiner

*Primary Examiner*—Willis R. Wolfe
(74) *Attorney, Agent, or Firm*—Fletcher, Yoder & Van Someren

(57) ABSTRACT

A system and method is provided for calibrating a position sensor having a variable output corresponding to the variable position of a movable member. The system and method establishes for the position sensor a first output corresponding to a first given position of the movable member. The system and method stores the first output from a first operating session in memory to use in establishing the first output for a second operating session. The system and method may also use a biasing factor in establishing the first output for a second operating session. The system and method may also establish a second output corresponding to a second given position of the movable member as a function of a second output from a previous operating session or as a function of a biasing factor. The system and method may be used to control an internal combustion engine.

34 Claims, 5 Drawing Sheets bing the throttle lever to the throttle. The system may also typically include a throttle position sensor for generating a throttle position control signal used by an electronic control unit (ECU). A throttle position control signal can be used, for example, for determining load demand by the operator and can relate acceleration and deceleration information to the ECU.

METHOD AND APPARATUS FOR CALIBRATING A POSITION SENSOR USED IN ENGINE CONTROL

BACKGROUND OF THE INVENTION

1. Field Of The Invention

The invention relates generally to apparatus and methods for controlling engine operation, and more particularly to apparatus and methods for determining the position of a sensor used for controlling engine operation.

2. Description Of The Related Art

It is generally known to provide engine control systems including one or more sensors for detecting a condition of engine operation and for generating a corresponding control signal used by the control system. An example of such a control system is a throttle control system for an internal combustion engine. Such a system typically includes a throttle lever, a throttle on the engine, and a linkage operably connecting the throttle lever to the throttle. The system may also typically include a throttle position sensor for generating a throttle position control signal used by an electronic control unit (ECU). A throttle position control signal can be used, for example, for determining load demand by the operator and can relate acceleration and deceleration information to the ECU.

Some such engine control systems may also include a neutral position switch that is operable to indicate the position of the throttle lever in the "neutral" position. This type of switch is commonly used in engine control systems, such as in marine applications, wherein the throttle lever position controls both the transmission driven by the engine as well as the throttle.

In most applications using the above described control systems, the assembly of the control system can entail laborious calibration or synchronization to assure proper correlation between the position of a throttle lever and the throttle lever control signal. Such calibration is necessary to account for variation in performance or sensitivity of the position sensor, and the manner in which the sensor is mounted to monitor the throttle lever position.

Recalibration of such an engine control system may be necessary after a period of engine operation or after control system maintenance or repair. Such calibration is critical to control systems using an ECU, and is often performed by skilled personnel.

There is a need, therefore, for an improved method of calibration which overcomes these drawbacks of prior art devices. There is a particular need for a reliable method for automatically calibrating a throttle. Moreover, there is presently a need for a throttle arrangement which can utilize a method for automatically calibrating a position sensor.

SUMMARY OF THE INVENTION

The invention provides a novel system and method designed to respond to these needs. The invention features a method of calibrating a position sensor having a variable output corresponding to the position of a movable member. The method comprises establishing a first output of a position sensor corresponding to a first position of a moveable member. The first output in the featured method is a function of at least one first output stored in memory from a previous operating session. The method may also include establishing the first output as a function of a correction factor, as well a function of at least one first output stored in memory from a previous operating session. The function establishing the first output may include averaging a plurality of first outputs stored in memory from previous operating sessions and a correction factor. The method may include assigning a first output if there is no first output stored in memory. The method may also include establishing a second output of a position sensor corresponding to a second position of a moveable member. The second output may be a function of a correction factor and at least one second output stored in memory from a previous operating session.

According to another aspect of the invention, a method of calibrating a throttle position sensor for an internal combustion engine is featured. The throttle position sensor having a variable output corresponding to movement of the throttle. The method includes storing in memory a first output corresponding to a first position of the throttle from one engine operating session. The method also includes establishing the first output corresponding to the first position of the throttle for a subsequent engine operating session as a function of the first output stored in memory. The method may also include establishing the first output for a second engine operating session as a function of a correction factor. The method may also include establishing a maximum output corresponding to the first position, the maximum output being greater than or equal to the first output. The maximum output may be established as the first output for a second engine operating session, if the first output for a subsequent engine operating session is greater than the maximum output.

According to another aspect of the present invention, an internal combustion engine having a variable position throttle, an electronic memory, and a throttle position sensor is featured. The throttle position sensor produces a variable output corresponding to movement of the variable position throttle. The throttle position sensor is calibrated between a first position of the variable position throttle and a second position of the variable position throttle. In the first position a first output value is produced and in the second position a second output value is produced. Either or both the first output value or second output value from a first engine operating session is stored in memory. The first output value for a second engine operating session is established as a function of the first output value stored in memory from the first engine operating session or the second output value for the second engine operating session is established as a function of the second output value stored in memory from the first engine operating session. The first position of the throttle may correspond to a neutral or idle position and the second position may correspond to a full or wide-open throttle position. The internal combustion engine may produce an output representing the variable throttle position as a percentage of wide-open throttle position. The first output value or second output value for a second engine operating session may also be established as a function of a biasing value.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

Figure 1:
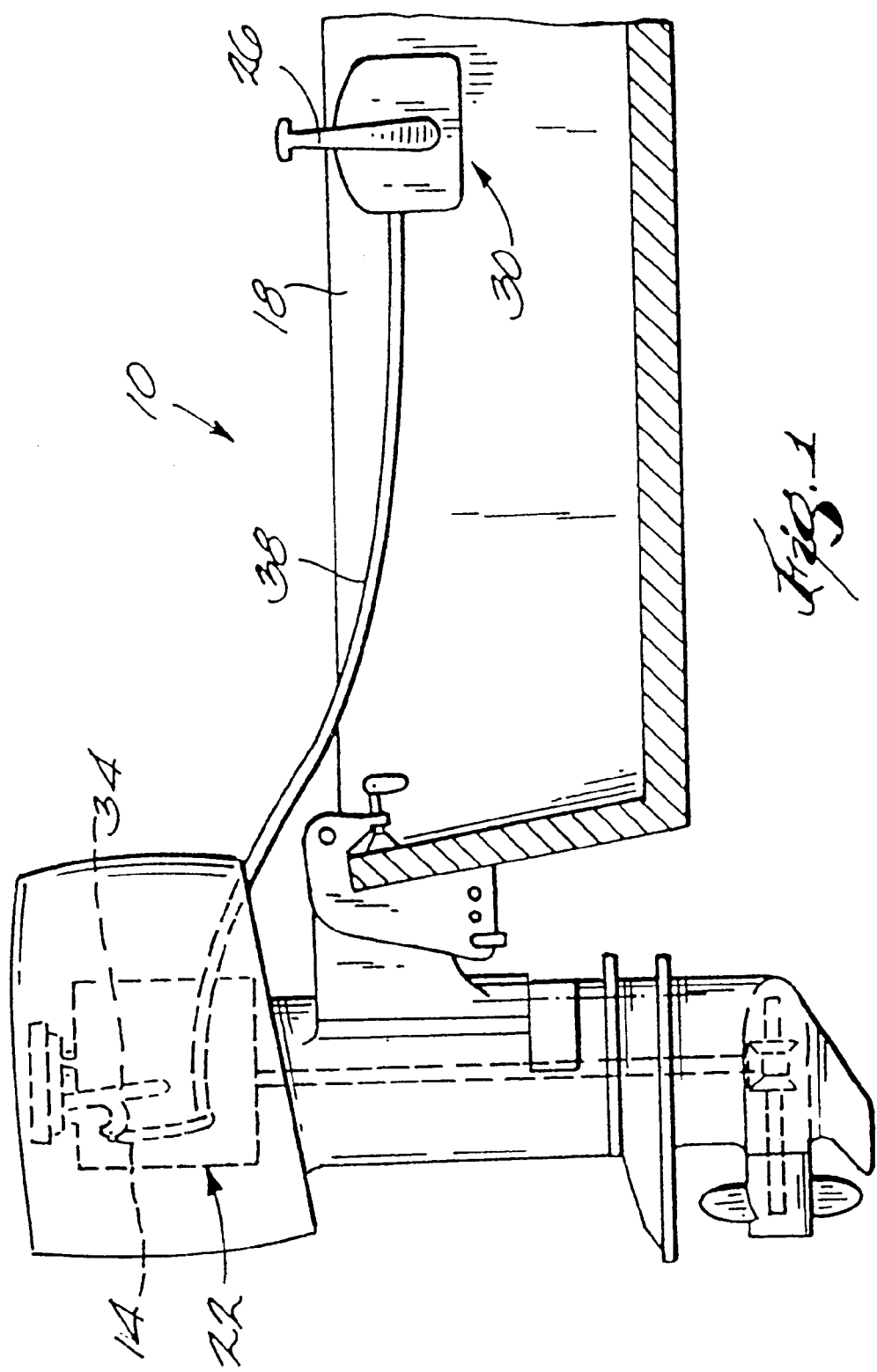
FIG. 1 is a schematic illustration of an engine control system, according to certain aspects of the present invention.

Turning now to the drawings and referring first to FIG. 1, a system 10 for controlling the operation of an engine 14 is illustrated. While the system 10 is applicable in many different types of engines, in the illustrated embodiment, the system 10 is located on a boat 18 which is driven by an outboard motor 18 including the engine 14.

The system 10 includes a throttle lever 26 that is rotatably supported for movement through a range of positions by a throttle lever housing 26 which is, in turn, fixed to the boat 18. The engine 14 includes a throttle 34 which is operably connected to the throttle lever 26 by means of a throttle linkage 38 and which is also moveable through a range of positions between idle and wide open.

Figure 2:
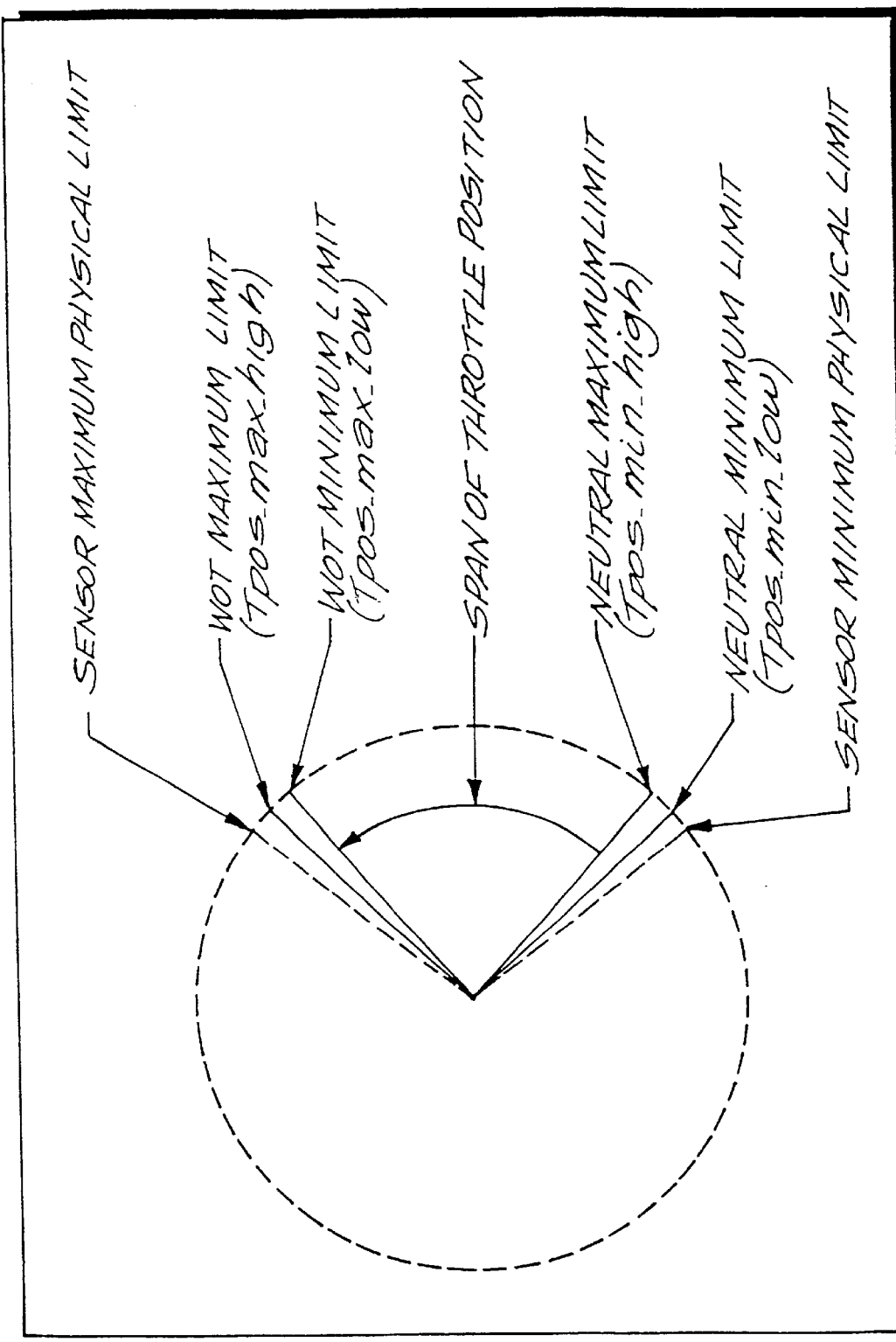
FIG. 2 is a diagram illustrating the operation of the embodiment shown in FIG. 1.

Ideally, when the throttle lever 26 is in a "neutral" position ("N"), the throttle 34 is in its idle position, and when the throttle lever 26 is fully advanced, the throttle 34 is in its wide open throttle position ("WOT"). FIG. 2 illustrates this range of movement of the throttle lever 26 as an arc labeled "span of throttle position".

The system 10 also includes (not shown) a throttle position sensor mounted within the housing for generating a throttle lever position control signal corresponding to the position of the throttle lever 26, and an electronic control unit ("ECU") for receiving control signals, such as the throttle lever position signal, and for controlling engine operating conditions in response to the control signals. Note that, the ECU may consist of a single unit or be separated into several components portions, such as a processor, electronic memory, an so forth. Furthermore, the functions the ECU performs may vary and be performed by several separate electronic devices. Also, the throttle position sensor and the ECU may be combined into a single electronic device.

The throttle position sensor has a range of movement that is somewhat greater than the range of movement of the throttle lever 26 so that, if the throttle position sensor is oriented properly with respect to the throttle lever 26, the throttle position sensor effectively generates a corresponding throttle lever position signal over the entire range of possible throttle positions. FIG. 2 illustrates this range of movement of the throttle position sensor as two limits: "sensor minimum physical limit" and "sensor maximum physical limit."

While the range of the throttle position sensor is greater than the range of the throttle lever 26, the excess range of the sensor is only marginal, and the sensor must still be located with care to assure that the full range of throttle position is covered. If the sensor is not so located, i.e., so that there are throttle lever positions outside the range of the sensor, the system 10 will recognize that condition in a manner discussed below.

The ECU receives the throttle signal position signal, as well as other control signals, and operates to varying engine operating conditions accordingly. The ECU receives the signal position signal in particular and, based upon assumed values of the control signal for the N and WOT positions, calculates the actual position of the throttle lever 26 ("TPOS") and the percent of full load demanded by the operator as indicated by the position of the throttle lever 26. The percent of full load demanded by the operator is used by the ECU in combination with the other control signals to control operation of the engine 14.

The ECU assumes two ranges of possible N and WOT values (see FIG. 2). In particular, the assumed range of N position lies between values TPOS_min_high and TPOS_min_low (indicated as Zone A in FIG. 5); and the assumed range of the WOT position lies between TOPS_max_high and TPOS_max_low (indicated as Zone C in FIG. 5). The ECU also assumes two values corresponding to WOT and N. These include a value TPOS_min, which is the assumed N position and has an initial value of TPOS_min_high, and TPOS_max, which is the assumed WOT position value equal to the value of TPOS_max_low.

Figure 3:
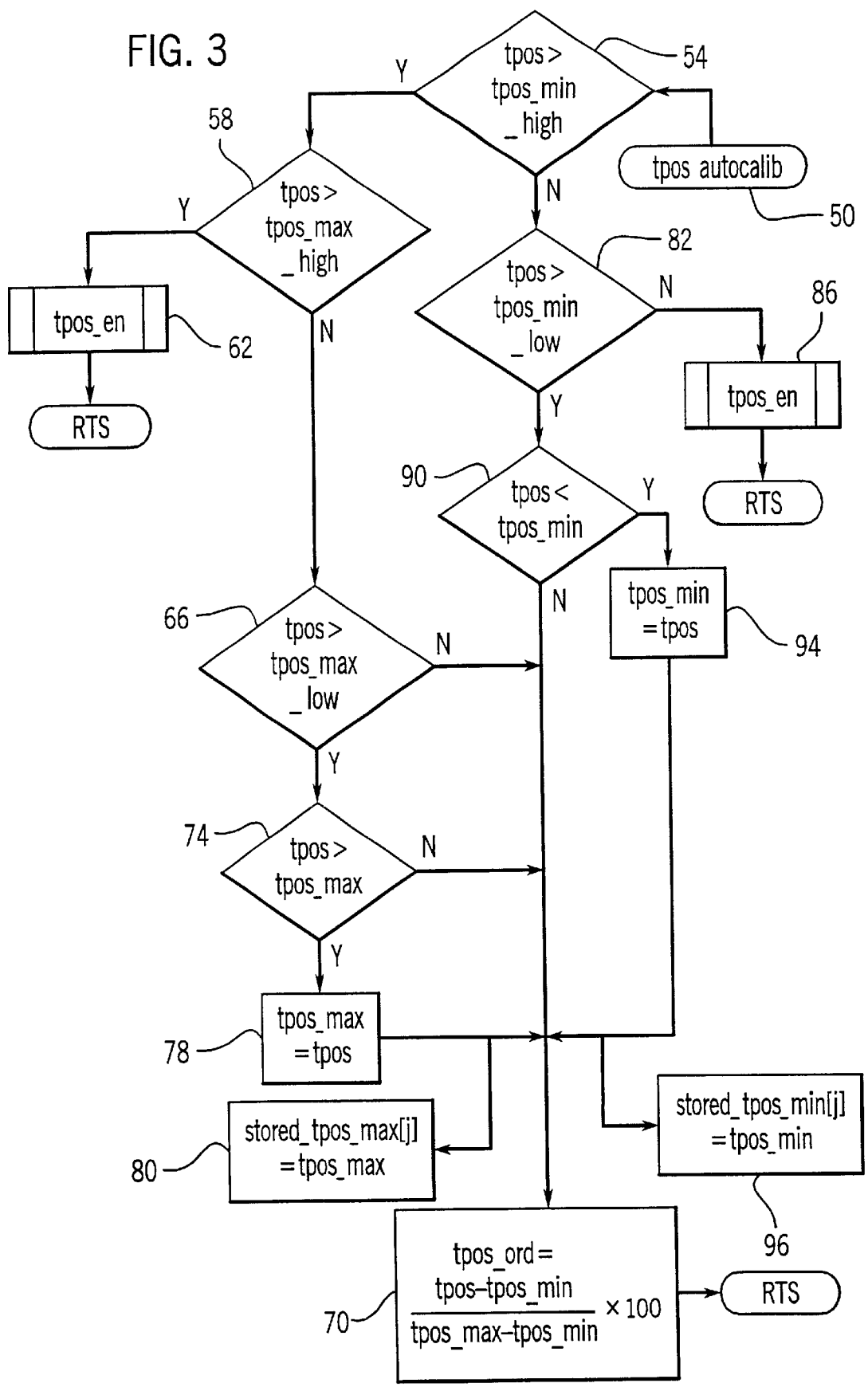
FIG. 3 is a logic diagram setting forth the operation of a throttle position sensor, according to a preferred embodiment of the present invention.
Figure 4:
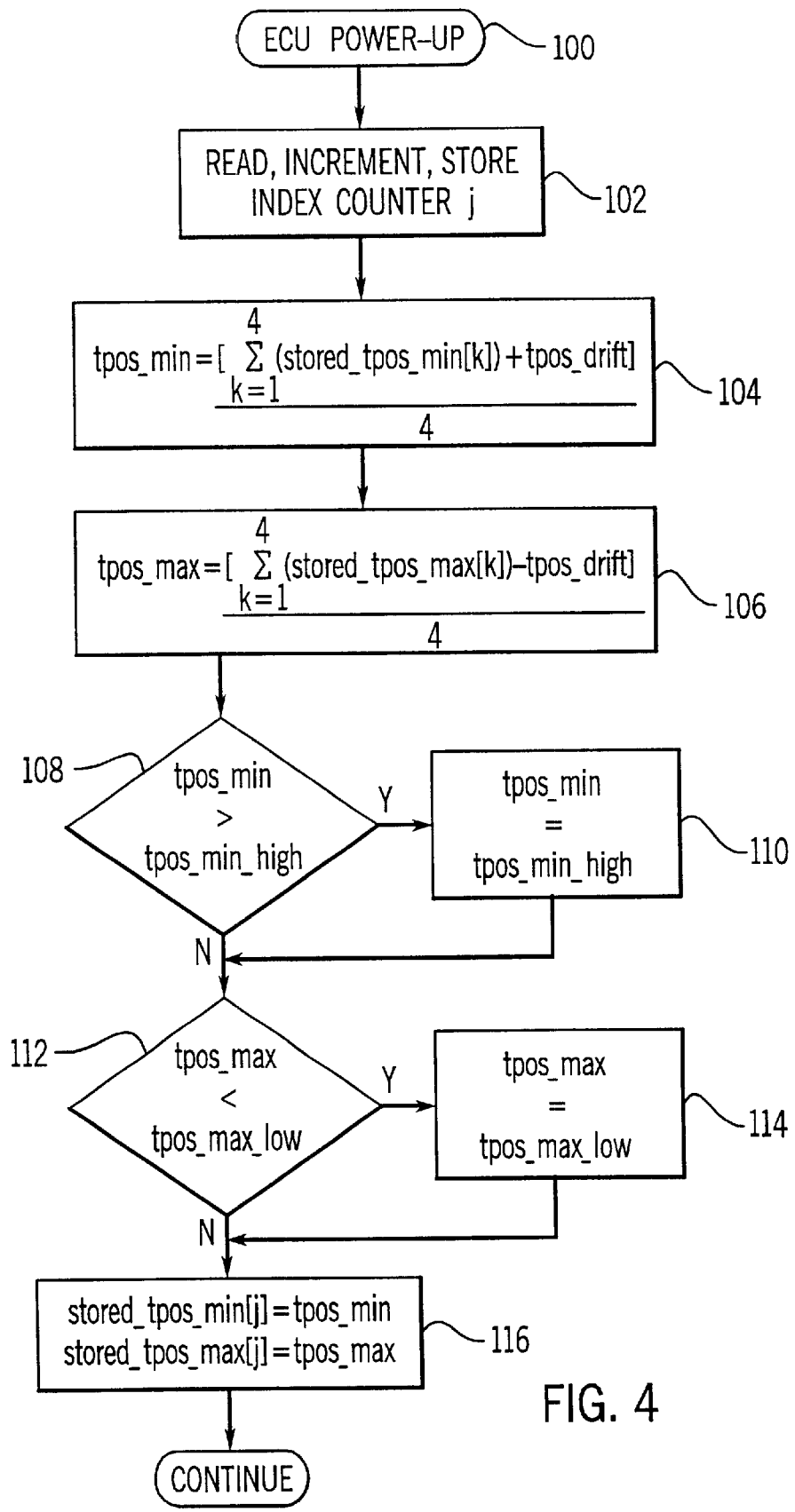
FIG. 4 is a logic diagram setting forth the operation of a throttle position sensor during system start-up, according to a preferred embodiment of the present invention.

Turning to FIGS. 3 and 4, and the graphical diagram of FIG. 5, the ECU operates in the following manner to calibrate the throttle position sensor and to calculate the percentage of full load demanded as indicated by the throttle lever position control signal.

Referring first to FIG. 3, calibration is desirable to account for variations in the signals or values provided by the throttle lever and its sensor, and in the values assumed or used by the ECU in controlling the engine. The following automatic calibration procedure calibrates the ECU to compensate for errors or changes in the signals or values by modifying the TPOS_max and TPOS_min values respectively. The autocalibration subroutine illustrated by FIG. 3 initiates at Step 50. Upon starting a first engine operating session, the ECU assumes two ranges of possible N and WOT values (see FIG. 2). The assumed range of N lies between values TPOS_min_high and TPOS_min_low (indicated as Zone A in FIG. 5). The assumed range of the WOT lies between TOPS_max_high and TPOS_max_low (indicated as Zone C in FIG. 5). The ECU also assumes two values corresponding to WOT and N. In particular, TPOS_min is the assumed N position and has an initial value of TPOS_min_high, and TPOS_max is the assumed WOT position value equal to the value of TPOS_max_low.

These ranges of values assumed by the ECU are assumed upon the beginning of the first engine operating session. The calibration of the throttle position sensor is checked automatically during each engine operating session. The ECU will update the values for TPOS_min and TPOS_max to reflect the actual values, if they differ from the assumed values. The ECU then stores the values of TPOS_min and TPOS_max for use in the present and subsequent engine operating sessions.

During the first engine operation session, the ECU starts the subroutine shown in FIG. 3. At decision block 54 the value of the throttle position control signal, which corresponds to the throttle lever position ("TPOS"), is compared with the assumed range of values for the neutral position. More particularly, the TPOS value is compared to the assumed value for TPOS_min_high. If the value of the throttle position control signal TPOS is greater than TPOS_min_high, this indicates that TPOS is greater than the assumed range for the N position, and the ECU then moves to decision block 58 to compare the value of TPOS with the assumed range of values for the WOT position.

At decision block 58, the value of TPOS is compared with the assumed value for TPOS_max_high. If the value of TPOS is not equal to or less than TPOS_max_high, which is an unexpected occurrence, then the subroutine terminates at block 62 and the ECU will initiate a diagnostic subroutine.

If, at block 58, the value of TPOS is less than TPOS_max_high, the ECU will compare TPOS with TPOS_ max_low at decision block 66 to thereby determine if the value of TPOS is in the assumed range for WOT. If not, the value of TPOS is between the assumed ranges for N and WOT, and the ECU moves to block 70 described in greater detail below. If, at block 66, TPOS is greater than TPOS_max_low, then the ECU will move to block 74 to compare TPOS with the assumed value for TPOS_max. If, at block 74, the value of TPOS is less than TPOS_max, the ECU moves to block 70. If the value of TPOS is greater than TPOS_max, then the ECU moves to block 78 and assigns TPOS_max the current actual value of TPOS.

The ECU then moves to block 70. Concurrently, at block 80, the ECU also stores TPOS_max values in a memory array, STORED_TPOS_max [j]. The "j" in this nomenclature corresponds to the number of engine operating sessions from which it is desired to store TPOS_max values. In the illustrated embodiment, "j" is a value that repeats from 1 to 4, corresponding to four engine operating sessions. However, only the STORED_TPOS_max value for the current engine operating session is changed. Furthermore, only the most recent value of TPOS_max is stored in STORED_TPOS_max for the current engine operating session. It should be noted that the exact number of TPOS_max values from previous operating sessions to be stored in memory is completely at the discretion of the designer.

If, however, at block 54 the value of TPOS is not greater than the assumed value of the N position, i.e., TPOS min_high, the ECU moves to block 82 and compares the value of TPOS with the value of TPOS_min_low.

Similar to the calculation at block 58, if at block 82 the value of TPOS is outside the assumed range of values for the N position (is not greater than or equal to TPOS_min_low) the subroutine is terminated at block 86 and the ECU initiates a diagnostic subroutine.

On the other hand, if at block 82 the value of TPOS is greater than TPOS_min_low, then the ECU moves to block 90 and compares the value of TPOS with the assumed value of TPOS_min, which is initially assumed to be equal to TPOS_min_high. If TPOS is not less than TPOS_min, then the ECU moves to block 70. If TPOS is less than TPOS_min, then the ECU moves to block 96 and reassigns TPOS_min the current value of TPOS.

In this embodiment, just as the TPOS_max values are stored in memory, TPOS_min values from four engine operating sessions are also stored in memory. In particular, at block 96, the most recent value of TPOS_min for the current engine operating session is stored in memory as STORED_TPOS_min[j].

The ECU then moves to block 70. At block 70, the ECU calculates the percentage of full load demanded by the operator (TPOS_ord) as indicated by the position of the throttle lever 26, which corresponds to the value of TPOS, and the relative value of TPOS to the range between N and WOT, which respectively correspond to the calculated values for TPOS_min and TPOS_max.

More particularly, the value of TPOS_min (the value for N position) is subtracted from the value for TPOS and is used as a numerator. The difference between TPOS_max and TPOS_min is used as a denominator. The numerator is then divided by the denominator and the quotient multiplied by 100 to obtain the percentage of full load demanded by the operator. Thus, for example, if the current value of TPOS is equal to TPOS_max, an indication that the throttle 34 is at WOT, then the value of TPOS_ord is 100% of full load demanded by the operator. Similarly, if the current value of TPOS is equal to TPOS_min, then the value of TPOS_ord is 0% of full load demanded by the operator. Following the calculation of TPOS_ord at block 70, the ECU exits the subroutine shown in FIG. 3. After a defined time interval, the autocalibration routine resumes again at block 50.

Referring generally to FIG. 4, in the illustrated embodiment, the values for TPOS_min and TPOS_max stored in a memory array from the four most recent engine operating sessions are retrieved and used to calculate new TPOS_min and TPOS_max values for the current engine operating session. Thus, there is no need for the values of TPOS_min and TPOS_max to be assumed after the first engine operating session. At block 100, the ECU is powered up at engine start up. At block 102 an ECU index counter counts incrementally from 1 to 4, reading the values stored in memory for STORED_TPOS_min [1] through STORED_TPOS_min [4], and STORED_TPOS_max [1] through STORED_TPOS_max [4]. The index counter also determines, for the current engine operating session, the "j" value for STORED_TPOS_max [j] and STORED_TPOS_min [j].

At block 104, the value of TPOS_min for the current engine operating session is established from the average of the four STORED_TPOS_min values and a biasing factor, TPOS_DRIFT. TPOS_DRIFT acts to drive the TPOS_min value upward in voltage, at least initially during startup to avoid setting a value which cannot later be modified by the calibration process.

At block 106, the value of TPOS_max for the current engine operating session is established from the average of the four STORED_TPOS_max values minus a biasing factor, TPOS_DRIFT. Here, TPOS_DRIFT acts to drive the TPOS_min value downward in voltage, at least initially during startup, again to void setting a value which cannot later be modified.

At decision block 108, the value of TPOS_min is compared with the TPOS_min_high value. If the value of TPOS_min is greater than TPOS_min_high, which is possible because of the addition of the TPOS_DRIFT value to the STORED_TPOS_min values, then at block 110, the TPOS_min value is made equal to the TPOS_min_high value.

At decision block 112, the value of TPOS_max is compared with the TPOS_max_low value. If the value of TPOS_max is less than TPOS_max_low, which is possible because of the subtraction of the TPOS_DRIFT value from the STORED_TPOS_max values, then at block 114, the TPOS_max value is made equal to the TPOS_max_low value.

At block 116, the new values of TPOS_min and TPOS_max are stored in STORED_TPOS_min[j] and STORED_TPOS_max[j]. These TPOS_min and TPOS_max values are used by the ECU to calculate the percentage of full load demanded by the operator in block 70 of FIG. 3.

Figure 5:
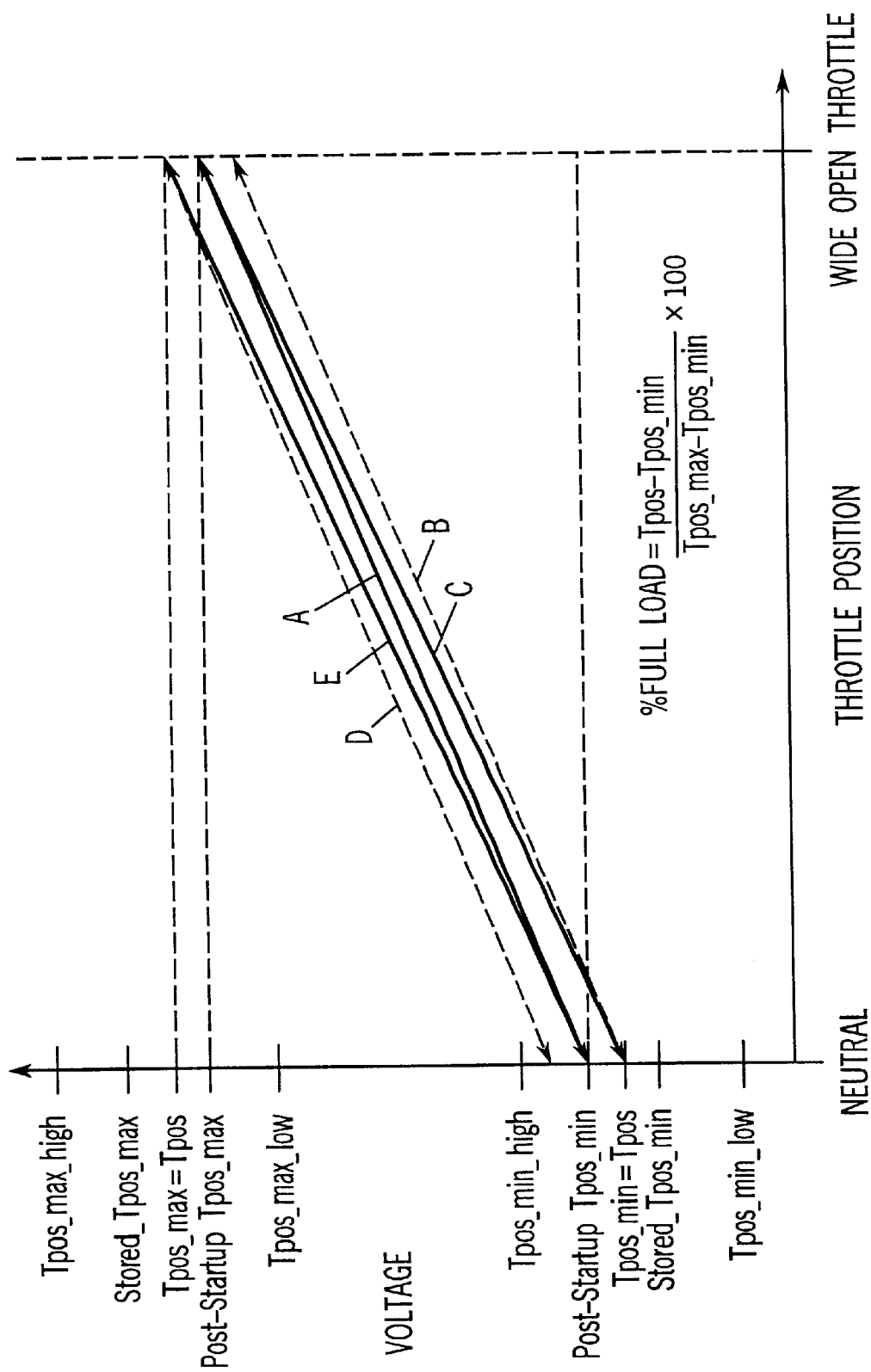
FIG. 5 is a diagram illustrating output of a throttle position sensor versus the position of the throttle position sensor, according to aspects of the present techniques.

Referring generally to FIG. 5, as summarized above, the throttle control signal is compared to the TPOS_min and TPOS_max values to determine the percent of full load demanded by the operator. The autocalibration procedure described above stores the values of TPOS_min and TPOS_max from several previous operating sessions in memory. Stored values for TPOS_min and Tpos_max are referenced in the diagram as Stored_Tpos_min and Stored_Tpos_max, respectively. The new value for TPOS_min established after start-up from the STORED_TPOS_min[j] values and the TPOS_DRIFT biasing factor is referenced in FIG. 5 as Post-Startup Tpos_min. Similarly, the new value for TPOS_max is referenced as Post-Startup TPOS_max.

Line A illustrates a proper correlation between the throttle lever, the throttle lever control signal and the TPOS__Max and TPOS__min values so that an accurate calculation of the percent of full load demanded by the operator is obtained. The throttle level control signal voltage increases linearly from the Post-Startup TPOS__min value, corresponding to the Neutral position, to the Post-Startup TPOS__max value, corresponding to the Full or Wide-Open throttle position. This produces a linear function for the percent of full load demanded by the operator from 0% at the Neutral position to 100% at the Wide-Open throttle position.

However, actual conditions or changes over time in the performance or sensitivity of the position sensor, or the manner in which the sensor is mounted to monitor the throttle lever position may produce variations in the correlation between the position of the throttle lever and the throttle lever control signal. For example, the actual voltage output of the throttle control signal may be lower than expected for a given throttle position, as referenced by line B. This will produce a lower percent of full load calculation than is actually being demanded by the operator. For example, in line B the throttle control signal at the Neutral throttle position is lower than the value for TPOS__min. Thus, the calculation of the percent of full load demanded by the operator at this throttle position would produce a negative value because TPOS-TPOS__min would be a negative value. As discussed above, the autocalibration procedure calibrates the ECU, at block 94, so that the value for TPOS__min is changed to the value of the throttle control signal value, TPOS. This produces the percent of full load demanded by the operator versus throttle position function referenced by line C. The autocalibration procedure ensures that when the throttle is in the neutral position the percent of full load demanded by the operator will not indicate less than 0%.

Conversely, if the actual voltage output of the throttle control signal is higher than expected for a given throttle position, as referenced by line D, a higher percent of full load demanded by the operator will be calculated. For example, in line D the throttle control signal at the WOT position is higher than the value for TPOS__max. Thus, the calculation of the percent of full load demanded by the operator would be greater than 100%. As discussed above, the autocalibration procedure of FIG. 3 calibrates the ECU, at block 78, so that the value for TPOS__max is changed to the value of the throttle control signal value, TPOS. This produces the percent of full load function referenced by line E. This ensures that when the throttle is in the WOT position the percent of full load demanded by the operator will not indicate greater than 100% full load. Note that in FIG. 5 the slope of line C is shown different from the slope of line B and the slope of line E is shown different from the slope of line D. However, there will be no difference in the slopes of the functions if there are corresponding changes in both the TPOS__min and TPOS__max values.

It will be understood that the foregoing description is of a preferred embodiment of this invention, and that the invention is not limited to the specific form shown. For example, TPOS__min and TPOS__max values need only be stored in memory from a single previous engine operating session. Furthermore, a variety of different mathematical function may be used to establish TPOS__min and TPOS__max values for a current engine operating session from TPOS__min and TPOS__max values stored in memory from a plurality of engine operating sessions. For example, a weighted average placing greater emphasis on the TPOS__min and TPOS__max values from the most recent engine operating session, rather than a simple average, could be used. Also, the biasing factor can be added before, or after, the stored TPOS__min and TPOS-max values are averaged. These and other modifications may be made in the design and arrangement of the elements without departing from the scope of the invention as expressed in the appended claims.

What is claimed is:

1. A method of calibrating a throttle control having a variable output corresponding to position of a movable member, comprising:

establishing a subsequent value for the first output of the throttle during a subsequent operating session as a function of the at least one first output stored in the memory from the previous operating session and a biasing factor.

2. The method as recited in claim 1, comprising:

assigning an initial value to the first output for use in subsequent operating sessions.

3. The method as recited in claim 1, comprising:

establishing a second output of a throttle corresponding to a second position of a moveable member, the second output being a function of a correction factor and at least one second output stored in memory from a previous operating session.

4. The method as recited in claim 1, the first output being an average of a plurality of first outputs stored in memory from previous operating sessions and a correction factor.

5. The method as recited in claim 1, comprising:

establishing a maximum output of the throttle corresponding to the first position;

establishing the maximum output as the first output if the subsequent value for the first output is greater than the maximum output; and storing the first output in memory.

6. The method as recited in claim 5, establishing a minimum output of the throttle corresponding to the first position;

determining an actual output of the throttle;

reestablishing the first output as the output corresponding to the first position of the member if the actual output is greater than or equal to the first output; and establishing the actual output as the output corresponding to the first position of the member and storing the output corresponding to the first position of the member if the actual output is less than the first output and greater than or equal to the minimum output of the throttle corresponding to the first position, and storing the first output in memory.

7. The method as recited in claim 6, comprising:

performing a diagnostic test if the first output is less than the minimum output value of the throttle corresponding to the first position.

8. A control system for an internal combustion engine, comprising:

a variable position throttle that produces an output corresponding to the variable position throttle position;

electronic memory; and an electronic control unit that controls internal combustion engine operation in response to the variable output from the throttle, the electronic control unit being calibrated between a first output corresponding to a first position of the variable position throttle and a second output corresponding to a second position of the variable position throttle, wherein a plurality of first outputs from a plurality of engine operating sessions are stored in memory or a plurality of second outputs from a plurality of engine operating sessions are stored in memory, and the first output for a subsequent engine operating session is established as a function of the plurality of first outputs stored in memory from the plurality of engine operating sessions or the second output for a subsequent engine operating session is established as a function of the plurality of second outputs stored in memory from the plurality of previous engine operating sessions.

9. The control system as recited in claim 8, wherein the throttle:

establishes a minimum output of the throttle corresponding to the first position of the variable position throttle;

determines an actual output of the throttle;

reestablishes the first output as the output corresponding to the first position of the variable position throttle if the actual output is greater than or equal to the first output value; and establishes the actual output as the output corresponding to the first position of the throttle if the actual output is less than the first output and greater than or equal to the minimum output of the throttle corresponding to the first position of the throttle.

10. The control system as recited in claim 8, comprising:

an indicator, to indicate to an operator the need to perform a diagnostic test if the first output is less than the minimum output of the throttle corresponding to the first position of the throttle.

11. The control system as recited in claim 8, wherein the first output or second output for a second engine operating session is established as a function of a biasing factor.

12. The control system as recited in claim 11, wherein the throttle:

establishes a maximum output of the throttle corresponding to the first position of the variable position throttle; and establishes the maximum output as the first output for the second engine operating session if the first output is greater than the maximum output.

13. The control system as recited in claim 8, wherein the memory is configured as an array of memory elements, such that a first output from a previous engine operating session is stored in at least one of the memory elements.

14. The control system as recited in claim 13, comprising:

an index counter that repeats a defined number sequence and establishes at the start of each operating session the memory element in the array of memory elements that will store first output values during that engine operating session.

15. The control system as recited in claim 8, wherein the first position of the throttle corresponds to a neutral or idle position and the second position corresponds to a full load or wide-open throttle position.

16. The control system as recited in claim 15, wherein the internal combustion engine is controlled in response to a signal representing a position of the variable position throttle as a percentage of the full or wide-open throttle position.

17. The control system as recited in claim 16, wherein the signal representing the position of the variable position throttle as a percentage of the full load or wide-open throttle position is a function of the difference between the variable output and the first output, divided by the difference between the second output and the first output.

18. A motor system, comprising:

an internal combustion engine;

a variable position throttle, operable to provide an indication of a desired internal combustion engine operating condition and to produce a variable output corresponding to the variable position throttle position; and an electronic control unit, having memory, that controls internal combustion engine operation in response to the variable output from the throttle, the electronic control unit being calibrated between a first output corresponding to a first position of the variable position throttle and a second output corresponding to a second position of the variable position throttle, wherein the first output from a first engine operating session is stored in memory or the second output from a first engine operating session is stored in memory, and the first output for a second engine operating session is established as a function of the first output stored in memory from the first engine operating session and a biasing factor or the second output for a second engine operating session is established as a function of the second output stored in memory from the first engine operating session and a biasing factor.

19. The motor system as recited in claim 18, wherein the throttle:

establishes a maximum output of the throttle corresponding to the first position of the variable position throttle; and establishes the maximum output as the first output for the second engine operating session if the first output is greater than the maximum output value.

20. The motor as recited in claim 18, wherein the throttle:

establishes a minimum output of the throttle corresponding to the first position of the variable position throttle;

determines an actual output of the throttle;

reestablishes the first output as the output corresponding to the first position of the variable position throttle if the actual output is greater than or equal to the first output; and establishes the actual output as the output corresponding to the first position of the throttle if the actual output is less than the first output and greater than or equal to the minimum output of the throttle corresponding to the first position of the throttle.

21. The motor system as recited in claim 18, wherein the memory is configured as an array of memory elements, such that a first output from a previous engine operating session is stored in at least one of the memory elements.

22. The motor system as recited in claim 21, comprising:

an index counter that repeats a defined number sequence and establishes at the start of each operating session the memory element in the array of memory elements that will store first output values during that engine operating session.

23. A method of operating a powered watercraft, comprising the acts of:

storing in a memory a plurality of first output values of a throttle, wherein a first output corresponds to an output of the throttle at a first throttle position; and establishing a value for the first output for a current operating session as a function of the plurality of first output values stored in the memory.

24. The method as recited in claim 23, wherein each of the plurality of first output values were stored in memory during separate previous engine operating sessions.

25. The method as recited in claim 23, wherein establishing further comprises establishing the value for the first output as a function of a biasing factor.

26. The method as recited in claim 23, further comprising the act of establishing an actual throttle position as a function of the value of the first output of the current engine operating session and an actual output of the throttle at the actual throttle position.

27. The method as recited in claim 23, wherein the first throttle position comprises an idle position of the throttle.

28. The method as recited in claim 23, further comprising the acts of:

establishing a maximum output value corresponding to the first throttle position; and identifying whether or not the current first output value is greater than the maximum output value during each operating session.

29. The method as recited in claim 28, further comprising the act of reestablishing the current first output value as the maximum output value when the current first output value is greater than the maximum output value.

30. The method as recited in claim 28, further comprising the act of storing the value of the first output of the current engine operating session in memory.

31. An internal combustion engine, comprising:

a variable position throttle operable to produce a throttle position signal; and an electronic control system coupled to the throttle, the system being operable to control the speed of the engine by establishing actual throttle position as a percentage of full throttle, the percentage of full throttle being a function of the throttle position signal, a first output corresponding to a minimum throttle position, and a second output corresponding to a maximum throttle position, wherein the electronic control system automatically calibrates the first and second outputs during periodic operating sessions, the first output being calibrated as a function of a previous first output stored in memory from a previous engine operating session and the second output being calibrated as a function of a previous second output stored in memory from a previous engine operating session.

32. The engine as recited in claim 31, wherein the electronic control system calibrates the first and second outputs during each operating session.

33. The engine as recited in claim 31, wherein the electronic control system calibrates the first and second outputs as a function of a plurality of previous first and second outputs respectively, each of the plurality of previous first and second outputs corresponding to a different previous engine operating session.

34. The engine as recited in claim 31, wherein the electronic control system calibrates the first and second outputs as a function of a biasing factor.

* * * * *